(12) United States Patent
Shimamoto et al.

(10) Patent No.: US 11,185,930 B2
(45) Date of Patent: Nov. 30, 2021

(54) CUTTING INSERT

(71) Applicant: SUMITOMO ELECTRIC HARDMETAL CORP., Itami (JP)

(72) Inventors: Yosuke Shimamoto, Sorachi-gun (JP); Naoki Matsuda, Sorachi-gun (JP); Hideo Maeno, Sorachi-gun (JP); Junya Okida, Sorachi-gun (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 138 days.

(21) Appl. No.: 16/318,021

(22) PCT Filed: Jul. 26, 2017

(86) PCT No.: PCT/JP2017/027023
§ 371 (c)(1),
(2) Date: Jan. 15, 2019

(87) PCT Pub. No.: WO2018/042957
PCT Pub. Date: Mar. 8, 2018

(65) Prior Publication Data
US 2020/0180038 A1    Jun. 11, 2020

(30) Foreign Application Priority Data

Aug. 31, 2016 (JP) .............................. JP2016-169082

(51) Int. Cl.
*B23B 27/22* (2006.01)
*B23B 27/14* (2006.01)

(52) U.S. Cl.
CPC .... *B23B 27/143* (2013.01); *B23B 2200/0471* (2013.01)

(58) Field of Classification Search
CPC .... B23B 2200/0452; B23B 2200/0471; B23B 2200/081; B23B 2200/201; B23B 27/143;
(Continued)

(56) References Cited

U.S. PATENT DOCUMENTS 5,282,703 A * 2/1994 Itaba .................... B23B 27/143
407/114
5,577,867 A    11/1996 Paya
(Continued)

FOREIGN PATENT DOCUMENTS

JP    H06-055312 A    3/1994
JP    H07-501271 A    2/1995
(Continued)

*Primary Examiner* — Sara Addisu
(74) *Attorney, Agent, or Firm* — Baker Botts L.L.P.; Michael A. Sartori

(57) ABSTRACT

A cutting edge includes a nose portion, a first cutting edge portion, and a second cutting edge portion. When a boundary between a first inclined portion and a first breaker portion, a boundary between a first step surface and a second breaker portion, a boundary between a second inclined portion and a third breaker portion, and a boundary between a second step surface and a fourth breaker portion are a first position, a second position, a third position, and a fourth position, respectively, the second position is higher than the first position and the fourth position is higher than the third position in a direction perpendicular to the seating surface, and a distance between the first position and the third position is greater than a distance between the second position and the fourth position in a direction parallel to the seating surface.

11 Claims, 10 Drawing Sheets

(58) Field of Classification Search
CPC ............. B23B 27/1618; Y10T 407/235; Y10T 407/24
See application file for complete search history.

(56) References Cited

U.S. PATENT DOCUMENTS

| | | | | |
|---|---|---|---|---|
| 7,182,555 | B2* | 2/2007 | Kitagawa | B23B 27/141 |
| | | | | 407/113 |
| 7,621,700 | B2* | 11/2009 | Jonsson | B23B 27/10 |
| | | | | 407/114 |
| 8,876,441 | B2* | 11/2014 | Majima | B23B 27/143 |
| | | | | 407/115 |
| 2008/0219784 | A1 | 9/2008 | Yamazaki et al. | |
| 2009/0226269 | A1* | 9/2009 | Iyori | B23B 27/143 |
| | | | | 407/114 |
| 2011/0142555 | A1 | 6/2011 | Yamazaki et al. | |
| 2015/0075338 | A1* | 3/2015 | Onodera | B23B 27/1607 |
| | | | | 82/1.11 |
| 2019/0009345 | A1* | 1/2019 | An | B23B 27/22 |

FOREIGN PATENT DOCUMENTS

| | | |
|---|---|---|
| JP | 2005-001024 A | 1/2005 |
| JP | 2007-301669 A | 11/2007 |
| JP | 2008-213122 A | 9/2008 |
| JP | 2010-069614 A | 4/2010 |

\* cited by examiner

CUTTING INSERT

TECHNICAL FIELD

The present invention relates to cutting tools. The present application claims the priority benefit of Japanese Patent Application No. 2016-169082 filed on Aug. 31, 2016, the contents of which are incorporated herein by reference in its entirety.

BACKGROUND ART

For example, Japanese Patent Laying-Open No. 2005-1024 (PTL 1), Japanese Patent Laying-Open No. 06-55312 (PTL 2), and Japanese Patent Laying-Open No. 2007-301669 (PTL 3) disclose a throw away chip for use in machining. The rake face of the throw away chip is provided with a plurality of breaker projections.

CITATION LIST

Patent Literature

PTL 1: Japanese Patent Laying-Open No. 2005-1024
PTL 2: Japanese Patent Laying-Open No. 06-55312
PTL 3: Japanese Patent Laying-Open No. 2007-301669

SUMMARY OF INVENTION

A cutting insert according to an aspect of the present invention includes a rake face, a flank face, and a seating surface. The flank face is continuous with the rake face. The seating surface is opposite to the rake face. A ridge line between the rake face and the flank face forms a cutting edge. The cutting edge includes a nose portion, a first cutting edge portion continuous with one end of the nose portion and having a linear shape, and a second cutting edge portion continuous with the other end of the nose portion and having a linear shape. The rake face is provided with a first projection, a second projection, a third projection, and a fourth projection. The first projection and the second projection are located on a bisector with an angle formed between the first cutting edge portion and the second cutting edge portion as viewed from a direction perpendicular to the seating surface. The second projection is opposite to the cutting edge with respect to the first projection. The third projection and the fourth projection are located on a first straight line inclined to the bisector as viewed from the direction perpendicular to the seating surface. The fourth projection is opposite to the cutting edge with respect to the third projection. In a first cross section including the bisector and perpendicular to the seating surface, the rake face has a first inclined portion located between the first projection and the cutting edge, a first breaker portion continuous with the first inclined portion and forming the first projection, a first step surface rising from the first breaker portion, and a second breaker portion continuous with the first step surface and forming the second projection. In a second cross section including the first straight line and perpendicular to the seating surface, the rake face has a second inclined portion located between the third projection and the cutting edge, a third breaker portion continuous with the second inclined portion and forming the third projection, a second step surface rising from the third breaker portion, and a fourth breaker portion continuous with the second step surface and forming the fourth projection. When a boundary between the first inclined portion and the first breaker portion, a boundary between the first step surface and the second breaker portion, a boundary between the second inclined portion and the third breaker portion, and a boundary between the second step surface and the fourth breaker portion are a first position, a second position, a third position, and a fourth position, respectively, the second position is higher than the first position and the fourth position is higher than the third position in the direction perpendicular to the seating surface, and a distance between the first position and the third position is greater than a distance between the second position and the fourth position in a direction parallel to the seating surface.

DETAILED DESCRIPTION

Figure 1:
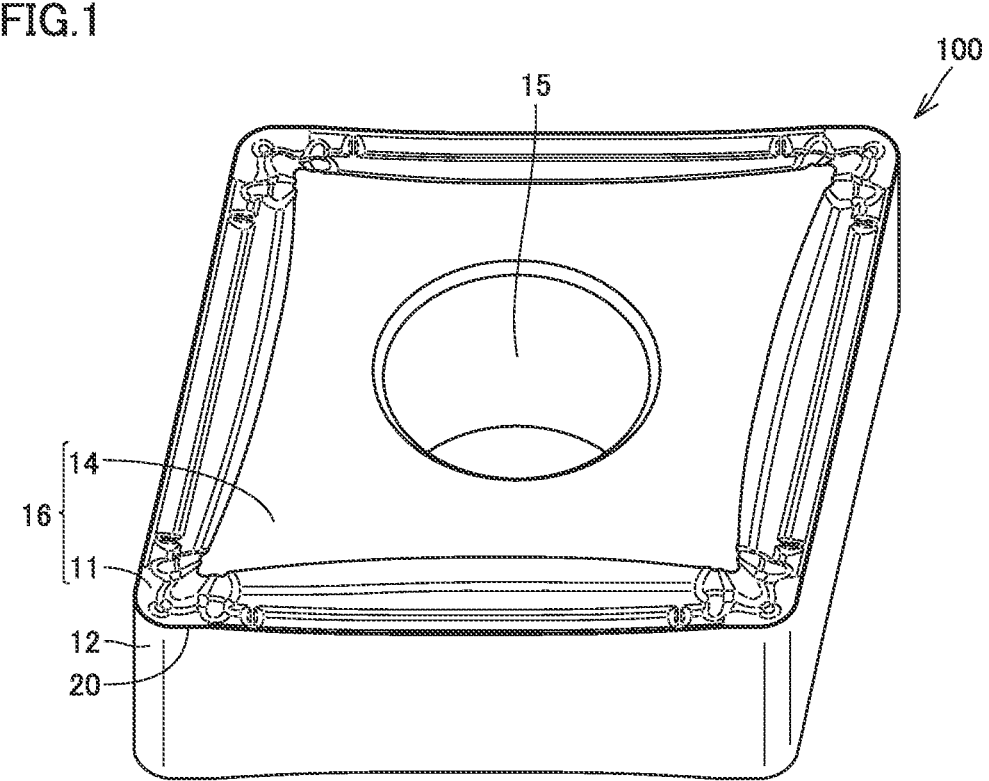
FIG. 1 is a schematic perspective view showing a configuration of a cutting insert according to Embodiment 1.

[Problem to be Solved by the Present Disclosure]

However, it is difficult to divide a chip into short pieces when pulling is performed with the throw away chips disclosed in Japanese Patent Laying-Open No. 2005-1024, Japanese Patent Laying-Open No. 06-55312, and Japanese Patent Laying-Open No. 2007-301669.

An object of an aspect of the present invention is to provide a cutting insert capable of dividing a chip into short pieces in pulling.

[Advantageous Effect of the Present Disclosure]

According to the aspect of the present invention, a cutting insert can be provided that can divide a chip into short pieces in pulling.

DESCRIPTION OF EMBODIMENTS

A summary of embodiments of the present invention will now be described.

(1) A cutting insert 100 according to an aspect of the present invention includes a rake face 11, a flank face 12, and a seating surface 13. Flank face 12 is continuous with rake face 11. Seating surface 13 is opposite to rake face 11. A ridge line between rake face 11 and flank face 12 forms a cutting edge 20. Cutting edge 20 includes a nose portion 23, a first cutting edge portion 21 continuous with one end of nose portion 23 and having a linear shape, and a second cutting edge portion 22 continuous with the other end of nose portion 23 and having a linear shape. Rake face 11 is provided with a first projection 1, a second projection 2, a third projection 3, and a fourth projection 4. First projection 1 and second projection 2 are located on a bisector L0 with an angle θ1 formed between first cutting edge portion 21 and second cutting edge portion 22, as viewed from a direction perpendicular to seating surface 13. Second projection 2 is opposite to cutting edge 20 with respect to first projection 1. Third projection 3 and fourth projection 4 are located on a first straight line inclined to bisector L0, as viewed from the direction perpendicular to seating surface 13. Fourth projection 4 is opposite to cutting edge 20 with respect to third projection 3. In a first cross section CS1 including bisector L0 and perpendicular to seating surface 13, rake face 11 has a first inclined portion A1 located between first projection 1 and cutting edge 20, a first breaker portion B1 continuous with first inclined portion A1 and forming first projection 1, a first step surface CS1 rising from first breaker portion B1, and a second breaker portion B2 continuous with first step surface S1 and forming second projection 2. In a second cross section CS2 including first straight line L1 and perpendicular to seating surface 13, rake face 11 has a second inclined portion A2 located between third projection 3 and cutting edge 20, a third breaker portion B3 continuous with second inclined portion A2 and forming third projection 3, a second step surface CS2 rising from third breaker portion B3, and a fourth breaker portion B4 continuous with second step surface S2 and forming fourth projection 4. When a boundary between first inclined portion A1 and first breaker portion B1, a boundary between first step surface S1 and second breaker portion B2, a boundary between second inclined portion S2 and third breaker portion B3, and a boundary between second step surface S2 and fourth breaker portion B4 are a first position P1, a second position P2, a third position P3, and a fourth position P4, respectively, second position P2 is higher than first position P1 and fourth position P4 is higher than third position P3 in the direction perpendicular to seating surface 13. A distance W1 between first position P1 and third position P3 is greater than a distance W2 between second position P2 and fourth position P4 in a direction parallel to seating surface 13 and perpendicular to first straight line L1.

Cutting insert 100 according to above (1) can divide a chip into short pieces in finishing. The function and effect obtained by dividing a chip into short pieces will be described below.

(2) In cutting insert 100 according to above (1), first projection 1 may form part of a spherical surface, and second projection 2 may form part of a cylindrical surface.

(3) In cutting insert 100 according to above (2), a radius of curvature of first projection 1 may be smaller than a radius of curvature of second projection 2 in a cross section perpendicular to the bisector.

(4) In cutting insert 100 according to any one of above (1) to (3), third projection 3 and fourth projection 4 may form part of a cylindrical surface.

(5) In cutting insert 100 according to above (4), a radius of curvature of third projection 3 may be smaller than a radius of curvature of fourth projection 4 in a cross section perpendicular to the first straight line.

(6) In cutting insert 100 according to any one of above (1) to (5), in first cross section CS1, a position of cutting edge 20 may be higher than first position P1 and lower than second position P2 in the direction perpendicular to seating surface 13.

(7) In cutting insert 100 according to any one of above (1) to (6), in second cross section CS2, a position of cutting edge 20 may be higher than third position P3 and lower than fourth position P4 in the direction perpendicular to seating surface 13.

(8) In cutting insert 100 according to any one of above (1) to (7), rake face 11 may be further provided with a fifth projection 5 and a sixth projection 6. As viewed from the direction perpendicular to seating surface 13, fifth projection 5 and sixth projection 6 may be located on a second straight line L2 inclined opposite to bisector L0 with respect to first straight line L1, and sixth projection 6 may be opposite to cutting edge 20 with respect to fifth projection 5. In a third cross section CS3 including second straight line L2 and perpendicular to seating surface 13, rake face 11 may have a third inclined portion A3 located between fifth projection 5 and cutting edge 20, a fifth breaker portion B5 continuous with third inclined portion A3 and forming fifth projection 5, a third step surface S3 rising from fifth breaker portion B5, and a sixth breaker portion B6 continuous with third step surface S3 and forming sixth projection 6. When a boundary between third inclined portion A3 and fifth breaker portion B5 and a boundary between third step surface S3 and sixth breaker portion B6 are a fifth position P5 and a sixth position P6, respectively, sixth position P6 may be higher than fifth position P5 in the direction perpendicular to seating surface 13.

(9) In cutting insert 100 according to any one of above (1) to (8), rake face 11 may be further provided with a seventh projection 7 and an eighth projection 8. As viewed from the direction perpendicular to seating surface 13, seventh projection 7 and eighth projection 8 may be located on a third straight line L3 inclined opposite to first straight line L1 with respect to bisector L0, and eighth projection 8 may be opposite to cutting edge 20 with respect to seventh projection 7. In a fourth cross section CS4 including third straight line L3 and perpendicular to seating surface 13, rake face 11 may have a fourth inclined portion A4 located between seventh projection 7 and cutting edge 20, a seventh breaker portion B7 continuous with fourth inclined portion A4 and forming seventh projection 7, a fourth step surface S4 rising from seventh breaker portion B7, and an eighth breaker portion B8 continuous with fourth step surface S4 and forming eighth projection 8. When a boundary between fourth inclined portion A4 and seventh breaker portion B7 and a boundary between fourth step surface S4 and eighth breaker portion B8 are a seventh position P7 and an eighth position P8, respectively, eighth position P8 may be higher than seventh position P7 in the direction perpendicular to seating surface 13, and a distance W3 between first position P1 and seventh position P7 may be greater than a distance W4 between second position P2 and eighth position P8 in a direction parallel to seating surface 13 and perpendicular to third straight line L3.

(10) In cutting insert 100 according to any one of above (1) to (9), as viewed from the direction perpendicular to seating surface 13, an angle of inclination θ2 of first straight line L1 to bisector L0 may be 20° or more and 90° or less.

(11) In cutting insert 100 according to any one of above (1) to (10), a distance W2 between second position P2 and fourth position P4 may be 0.5 mm or more and 3.0 mm or less in the direction parallel to seating surface 13 and perpendicular to first straight line L1.

DETAILS OF EMBODIMENTS

Embodiments of the present invention will now be described in detail with reference to the drawings. It should be noted that in the following drawings, the same or corresponding parts are denoted by the same reference numerals, and the description thereof will not be repeated. Also, at least some of embodiments described below may be combined appropriately.

Embodiment 1

A configuration of a cutting insert 100 according to Embodiment 1 will now be described.

Figure 2:
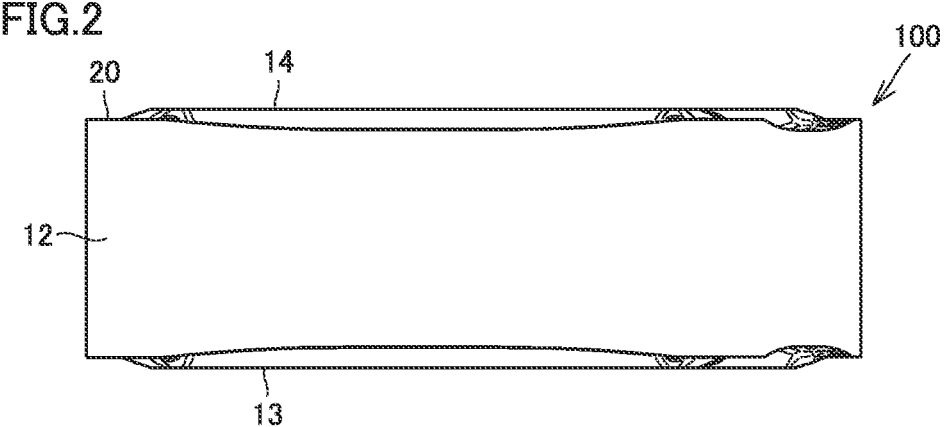
FIG. 2 is a schematic front view showing a configuration of the cutting insert according to Embodiment 1.
Figure 3:
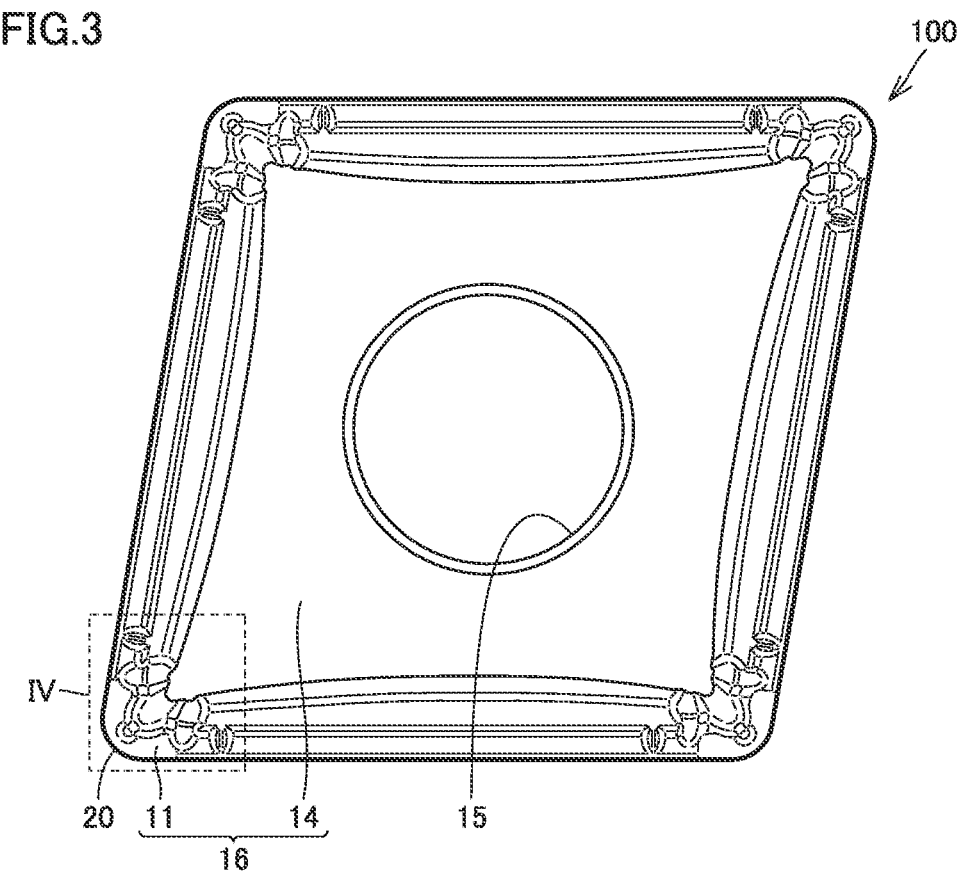
FIG. 3 is a schematic plan view showing a configuration of the cutting insert according to Embodiment 1.

As shown in FIGS. 1 to 3, cutting insert 100 according to Embodiment 1 mainly has a rake face 11, a flank face 12, a seating surface 13, and a boss surface 14. Flank face 12 is continuous with rake face 11. Rake face 11 is continuous with boss surface 14. As shown in FIG. 2, seating surface 13 is opposite to rake face 11. A through-hole 15 is open on both of boss surface 14 and seating surface 13. Seating surface 13 is nearly parallel to boss surface 14. Rake face 11 and boss surface 14 form an upper surface 16. As viewed from a direction perpendicular to boss surface 14 (hereinafter, also referred to as "in plan view"), upper surface 16 has a generally parallelogram shape. In plan view, rake face 11 surrounds boss surface 14. A ridge line between rake face 11 and flank face 12 forms a cutting edge 20.

Figure 4:
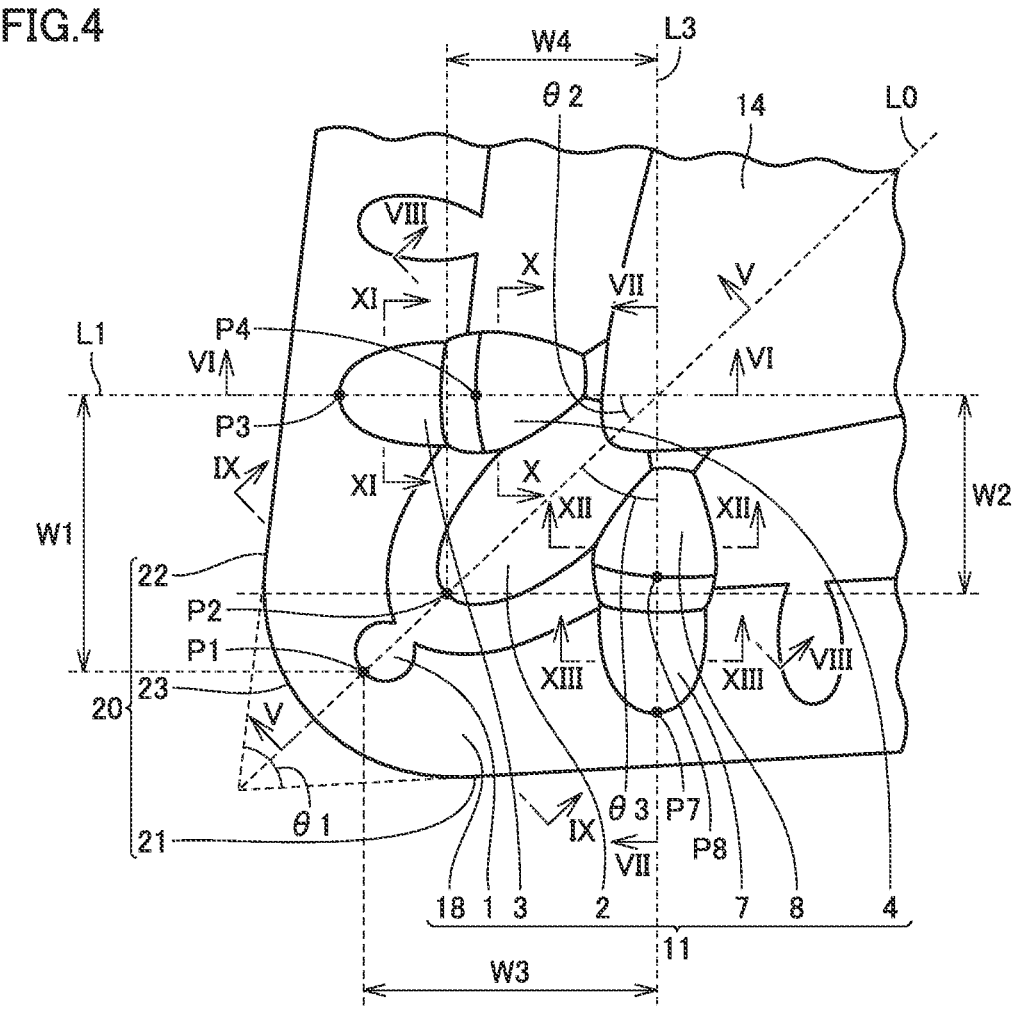
FIG. 4 is an enlarged view of a region IV in FIG. 3.

As shown in FIG. 4, cutting edge 20 includes a nose portion 23, a first cutting edge portion 21, and a second cutting edge portion 22. First cutting edge portion 21 is a linear portion continuous with one end of nose portion 23. Second cutting edge portion 22 is a linear portion continuous with the other end of nose portion 23. Nose portion 23 is located between first cutting edge portion 21 and second cutting edge portion 22. Rake face 11 is provided with a first projection 1, a second projection 2, a third projection 3, a fourth projection 4, a seventh projection 7, and an eighth projection 8. In plan view, an angle θ1 formed between first cutting edge portion 21 and second cutting edge portion 22 is, for example, 80°. Angle θ1 may be 35° or more and 90° or less. Angle θ1 is less than 90°.

First projection 1 and second projection 2 are located on a bisector L0 with an angle θ formed between first cutting edge portion 21 and second cutting edge portion 22, as viewed from the direction perpendicular to seating surface 13. Second projection 2 is opposite to nose portion 23 of cutting edge 20 with respect to first projection 1. In other words, first projection 1 is located between nose portion 23 and second projection 2.

Third projection 3 and fourth projection 4 are located on a first straight line L1 inclined to bisector L0, as viewed from the direction perpendicular to seating surface 13. As viewed from the direction perpendicular to seating surface 13, an angle of inclination θ2 of first straight line L1 to bisector L0 is, for example, 40°. Angle of inclination θ2 is, for example, 20° or more and 90° or less. Angle of inclination θ2 may be 30° or more and 45° or less, or 35° or more and 45° or less. Fourth projection 4 is opposite to second cutting edge portion 22 of cutting edge 20 with respect to third projection 3. In other words, third projection 3 is located between second cutting edge portion 22 and fourth projection 4.

As viewed from the direction perpendicular to seating surface 13, seventh projection 7 and eighth projection 8 are located on a third straight line L3 inclined opposite to first straight line L1 with respect to bisector L0. As viewed from the direction perpendicular to seating surface 13, an angle of inclination θ3 of third straight line L3 to bisector L0 is, for example, 40°. Preferably, angle of inclination θ3 of third straight line L3 to bisector L0 is equal to angle of inclination θ2 of first straight line L1 to bisector L0. As viewed from the direction perpendicular to seating surface 13, eighth projection 8 may be opposite to first cutting edge portion 21 of cutting edge 20 with respect to seventh projection 7. In other words, seventh projection 7 is located between first cutting edge portion 21 and eighth projection 8. Preferably, the shapes of fourth projection 4 and eighth projection 8 have line symmetry with bisector L0 as an axis of symmetry. Preferably, the shapes of third projection 3 and seventh projection 7 have line symmetry with bisector L0 as an axis of symmetry.

Figure 5:
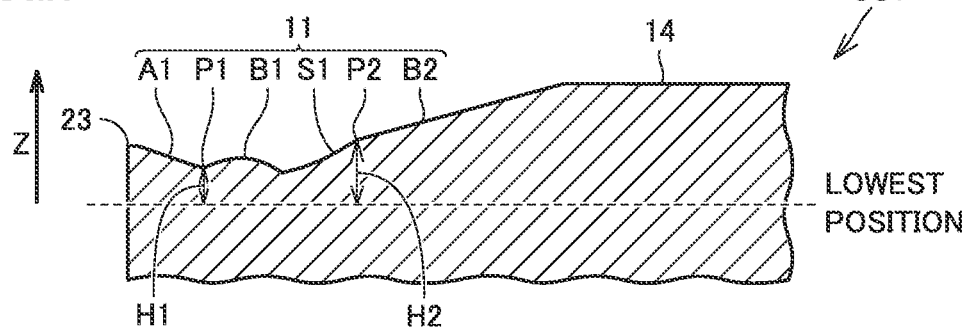
FIG. 5 is a schematic end view taken along line V-V in FIG. 4.

As shown in FIGS. 4 and 5, in a first cross section CS1 including bisector L0 and perpendicular to seating surface 13, rake face 11 has a first inclined portion A1, a first breaker portion B1, a first step surface S1, and a second breaker portion B2. First inclined portion A1 is located between first projection 1 and nose portion 23 of cutting edge 20. First breaker portion B1 is continuous with first inclined portion A1 and forms first projection 1. First step surface S1 rises from first breaker portion B1. Second breaker portion B2 is continuous with first step surface S1 and forms second projection 2.

A boundary between first inclined portion A1 and first breaker portion B1 and a boundary between first step surface S1 and second breaker portion B2 are a first position P1 and a second position P2, respectively. In this case, second position P2 is higher than first position P1 in a direction Z perpendicular to seating surface 13. In other words, in direction Z perpendicular to seating surface 13, a distance H2 from the lowest position of rake face 11 to second position P2 is greater than a distance H1 from the lowest position to first position P1. In first cross section CS1, the position of nose portion 23 of cutting edge 20 may be higher than first position P1 and lower than second position P2 in the direction perpendicular to seating surface 13.

As shown in FIG. 5, the height of first inclined portion A1 decreases monotonously as apart from nose portion 23 (i.e., from nose portion 23 toward boss surface 14). As apart from nose portion 23, the height of first breaker portion B1 increases monotonously, takes the maximum value, and then decreases monotonously. The height of first step surface S1 increases monotonously as apart from nose portion 23. The height of second breaker portion B2 increases monotonously as apart from nose portion 23. The angle of inclination of first step surface S1 is greater than the angle of inclination of second breaker portion B2. Second position P2 is a position of a point of inflection at which the angle of inclination changes. First position P1 is a position indicative of the minimum height of rake face 11 in first cross section CS1.

Figure 6:
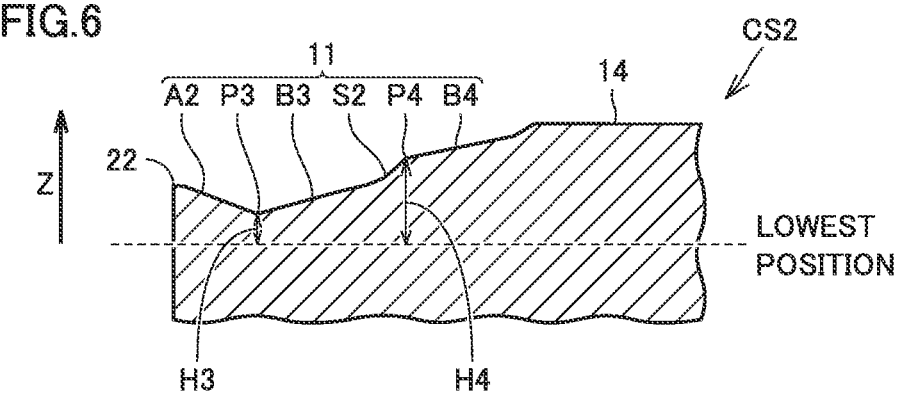
FIG. 6 is a schematic end view taken along line VI-VI in FIG. 4.

As shown in FIGS. 4 and 6, in a second cross section CS2 including first straight line L1 and perpendicular to seating surface 13, rake face 11 has a second inclined portion A2, a third breaker portion B3, a second step surface S2, and a fourth breaker portion B4. Second inclined portion A2 is located between third projection 3 and second cutting edge portion 22 of cutting edge 20. Third breaker portion B3 is continuous with second inclined portion A2 and forms third projection 3. Second step surface S2 rises from third breaker portion B3. Fourth breaker portion B4 is continuous with second step surface S2 and forms fourth projection 4.

A boundary between second inclined portion A2 and third breaker portion B3 and a boundary between second step surface S2 and fourth breaker portion B4 are a third position P3 and a fourth position P4, respectively. In this case, fourth position P4 is higher than third position P3 in the direction perpendicular to seating surface 13. In other words, a distance H4 from the lowest position of rake face 11 to fourth position P4 is greater than a distance H3 from the lowest position to third position P3 in direction Z perpendicular to seating surface 13. In second cross section CS2, the position of second cutting edge portion 22 of cutting edge 20 may be higher than third position P3 and lower than fourth position P4 in the direction perpendicular to seating surface 13.

As shown in FIG. 6, the height of second inclined portion A2 decreases monotonously as apart from second cutting edge portion 22 (i.e., from second cutting edge portion 22 toward boss surface 14). As apart from second cutting edge portion 22, the height of third breaker portion B3 increases monotonously. The height of first step surface S1 increases monotonously as apart from second cutting edge portion 22. The height of fourth breaker portion B4 increases monotonously as apart from second cutting edge portion 22. The angle of inclination of second step surface S2 is greater than the angles of inclination of third breaker portion B3 and fourth breaker portion B4. Fourth position P4 is a position of a point of inflection at which the angle of inclination changes. Third position P3 is a position indicative of the minimum height of rake face 11 in second cross section CS2.

Figure 7:
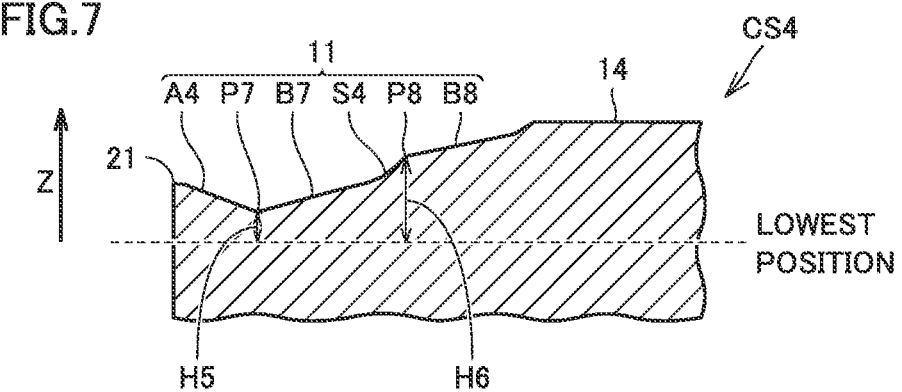
FIG. 7 is a schematic end view taken along line VII-VII in FIG. 4.

As shown in FIGS. 4 and 7, in a fourth cross section CS4 including third straight line L3 and perpendicular to seating surface 13, rake face 11 has a fourth inclined portion A4, a seventh breaker portion B7, a fourth step surface S4, and an eighth breaker portion B8. Fourth inclined portion A4 is located between seventh projection 7 and cutting edge 20. Seventh breaker portion B7 is continuous with fourth inclined portion A4 and forms seventh projection 7. Fourth step surface S4 rises from seventh breaker portion B7. Eighth breaker portion B8 is continuous with fourth step surface S4 and forms eighth projection 8.

A boundary between fourth inclined portion A4 and seventh breaker portion B7 and a boundary between fourth step surface S4 and eighth breaker portion B8 are a seventh position P7 and an eighth position P8, respectively. In this case, eighth position P8 is higher than seventh position P7 in the direction perpendicular to seating surface 13. In other words, a distance H6 from the lowest position of rake face 11 to eighth position P8 is greater than a distance H5 from the lowest position to seventh position P7 in direction Z perpendicular to seating surface 13. In fourth cross section CS4, the position of first cutting edge portion 21 of cutting edge 20 may be higher than seventh position P7 and lower than eighth position P8 in the direction perpendicular to seating surface 13.

As shown in FIG. 7, the height of fourth inclined portion A4 decreases monotonously as apart from first cutting edge portion 21 (i.e., from first cutting edge portion 21 toward boss surface 14). The height of seventh breaker portion B7 increases monotonously as apart from first cutting edge portion 21. The height of fourth step surface S4 increases monotonously as apart from first cutting edge portion 21. The height of eighth breaker portion B8 increases monotonously as apart from first cutting edge portion 21. The angle of inclination of fourth step surface S4 is greater than the angles of inclination of seventh breaker portion B7 and eighth breaker portion B8. Eighth position P8 is a position of a point of inflection at which the angle of inclination changes. Seventh position P7 is a position indicative of the minimum height of rake face 11 in fourth cross section CS4.

Figure 8:
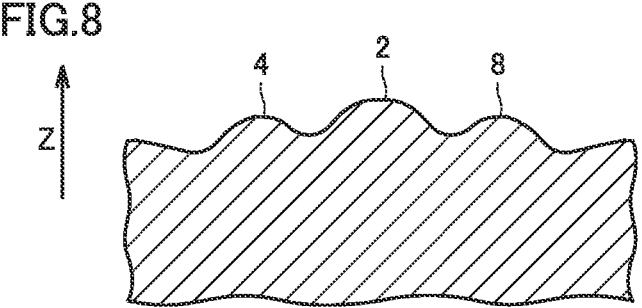
FIG. 8 is a schematic end view taken along line VIII-VIII in FIG. 4.

As shown in FIG. 8, in a cross section perpendicular to bisector L0, second projection 2 is located between fourth projection 4 and eighth projection 8. As shown in FIG. 8, the top of second projection 2 may be higher than the top of fourth projection 4 and the top portion of eighth projection 8 in direction Z perpendicular to seating surface 13.

Figure 9:
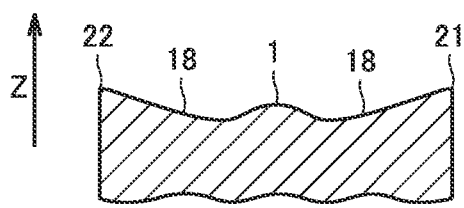
FIG. 9 is a schematic end view taken along line IX-IX in FIG. 4.

As shown in FIG. 9, in the cross section perpendicular to bisector L0, first projection 1 is located between first cutting edge portion 21 and second cutting edge portion 22. First projection 1 is sandwiched between an inclined surface 18 continuous from first cutting edge portion 21 and an inclined surface 18 continuous from second cutting edge portion 22. As shown in FIG. 9, the top of first projection 1 may be lower than first cutting edge portion 21 and second cutting edge portion 22 in direction Z perpendicular to seating surface 13.

As shown in FIGS. 8 and 9, first projection 1 and second projection 2 each have a curved portion projecting outwardly. First projection 1 forms, for example, part of a spherical surface. Second projection 2 forms, for example, part of a cylindrical surface. As shown in FIGS. 8 and 9, the radius of curvature of first projection 1 may be smaller than the radius of curvature of second projection 2 in the cross section perpendicular to the bisector. The radius of curvature of first projection 1 is, for example, 0.1 mm or more and 0.3 mm or less. The radius of curvature of second projection 2 is, for example, 0.2 mm or more and 0.5 mm or less.

Figure 10:
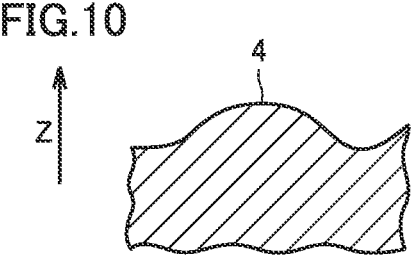
FIG. 10 is a schematic end view taken along line X-X in FIG. 4.
Figure 11:
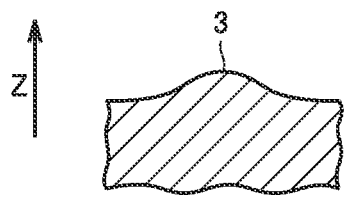
FIG. 11 is a schematic end view taken along line XI-XI in FIG. 4.

As shown in FIG. 10, fourth projection 4 has a curved portion projecting outwardly. Fourth projection 4 may form part of a cylindrical surface. As shown in FIG. 11, third projection 3 has a curved portion projecting outwardly. Third projection 3 may form part of a cylindrical surface. As shown in FIGS. 10 and 11, the radius of curvature of third projection 3 may be smaller than the radius of curvature of fourth projection 4 in the cross section perpendicular to first straight line L1. The radius of curvature of third projection 3 is, for example, 0.1 mm or more and 0.3 mm or less. The radius of curvature of fourth projection 4 is, for example, 0.2 mm or more and 0.5 mm or less.

Figure 12:
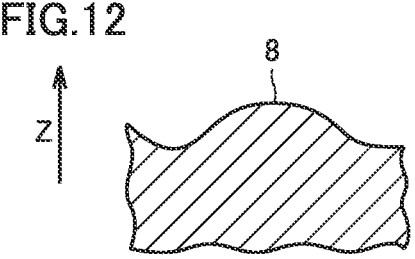
FIG. 12 is a schematic end view taken along line XII-XII in FIG. 4.
Figure 13:
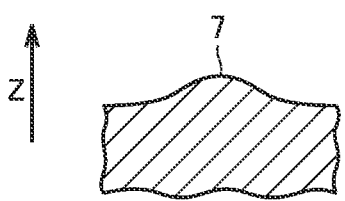
FIG. 13 is a schematic end view taken along line XIII-XIII in FIG. 4.

As shown in FIG. 12, eighth projection 8 has a curved portion projecting outwardly. Eighth projection 8 may form part of a cylindrical surface. As shown in FIG. 13, seventh projection 7 has a curved portion projecting outwardly.

Seventh projection 7 may form part of a cylindrical surface. As shown in FIGS. 12 and 13, the radius of curvature of seventh projection 7 may be smaller than the radius of curvature of eighth projection 8 in the cross section perpendicular to third straight line L3. As shown in FIGS. 10 and 12, the sectional shapes of fourth projection 4 and eighth projection 8 may have line symmetry with respect to bisector L0. As shown in FIGS. 11 and 13, the sectional shapes of third projection 3 and seventh projection 7 may have line symmetry with respect to bisector L0.

As shown in FIG. 4, in the direction parallel to seating surface 13 and perpendicular to first straight line L1, a distance W1 between first position P1 and third position P3 is greater than a distance W2 between second position P2 and fourth position P4. Distance W1 is, for example, 0.8 mm or more and 4.0 mm or less. Distance W1 may be 0.8 mm or more and 2.0 mm or less. Distance W2 is, for example, 0.5 mm or more and 3.0 mm or less. Distance W2 may be 0.5 mm or more and 2.0 mm or less. Similarly, in the direction parallel to seating surface 13 and perpendicular to third straight line L3, a distance W3 between first position P1 and seventh position P7 may be greater than a distance W4 between second position P2 and eighth position P8. Distance W3 is nearly equal to distance W1. Distance W4 is nearly equal to distance W2.

The function and effect of cutting insert 100 according to Embodiment 1 will now be described.

Figure 14:
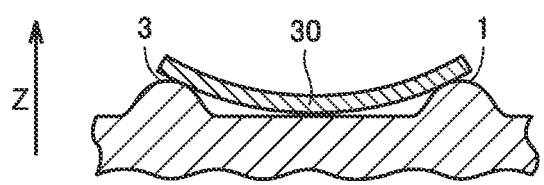
FIG. 14 is a schematic sectional view showing a first state of a chip.
Figure 15:
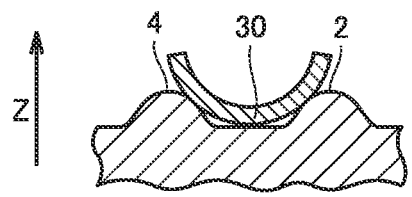
FIG. 15 is a schematic sectional view showing a second state of a chip.

In cutting insert 100 according to Embodiment 1, distance W1 between first position P1 and third position P3 is greater than distance W2 between second position P2 and fourth position P4 in the direction parallel to seating surface 13 and perpendicular to first straight line L1. During pulling, a chip 30 that is a workpiece, cut by a cutting edge, moves from second cutting edge portion 22 of cutting edge 20 toward the space sandwiched between first projection 1 and third projection 3. As shown in FIG. 14, the opposite ends of chip 30 are retained by first projection 1 and third projection 3. As a result, a stress is applied to the opposite ends of chip 30, thus distorting chip 30. Subsequently, chip 30 moves toward the space sandwiched between second projection 2 and fourth projection 4. Distance W2 between second position P2 of second projection 2 and fourth position P4 of fourth projection 4 is smaller than distance W1 between first position P1 of first projection 1 and third position P3 of third projection 3. Consequently, as shown in FIG. 15, a higher stress is applied to the opposite ends of chip 30, further distorting chip 30. Second position P2 of second projection 2 is higher than first position P1 of first projection 1, and fourth position P4 of fourth projection 4 is higher than third position P3 of third projection 3. Consequently, a stress having a component perpendicular to rake face 11 is applied to chip 30, distorting chip 30 in the direction having the component perpendicular to rake face 11, which curls chip 30. As described above, a stress in the width direction and the thickness direction of chip 30 is applied to chip 30 by a breaker at the second stage (second projection 2 and fourth projection 4) while retaining the opposite ends of chip 30 by a breaker at the first stage (first projection 1 and third projection 3), allowing chip 30 to be divided into short pieces while stably curling chip 30.

Embodiment 2

A configuration of cutting insert 100 according to Embodiment 2 will now be described. A configuration different from that of the cutting insert according to Embodiment 1 will be mainly described below, and similar description will not be repeated.

Figure 16:
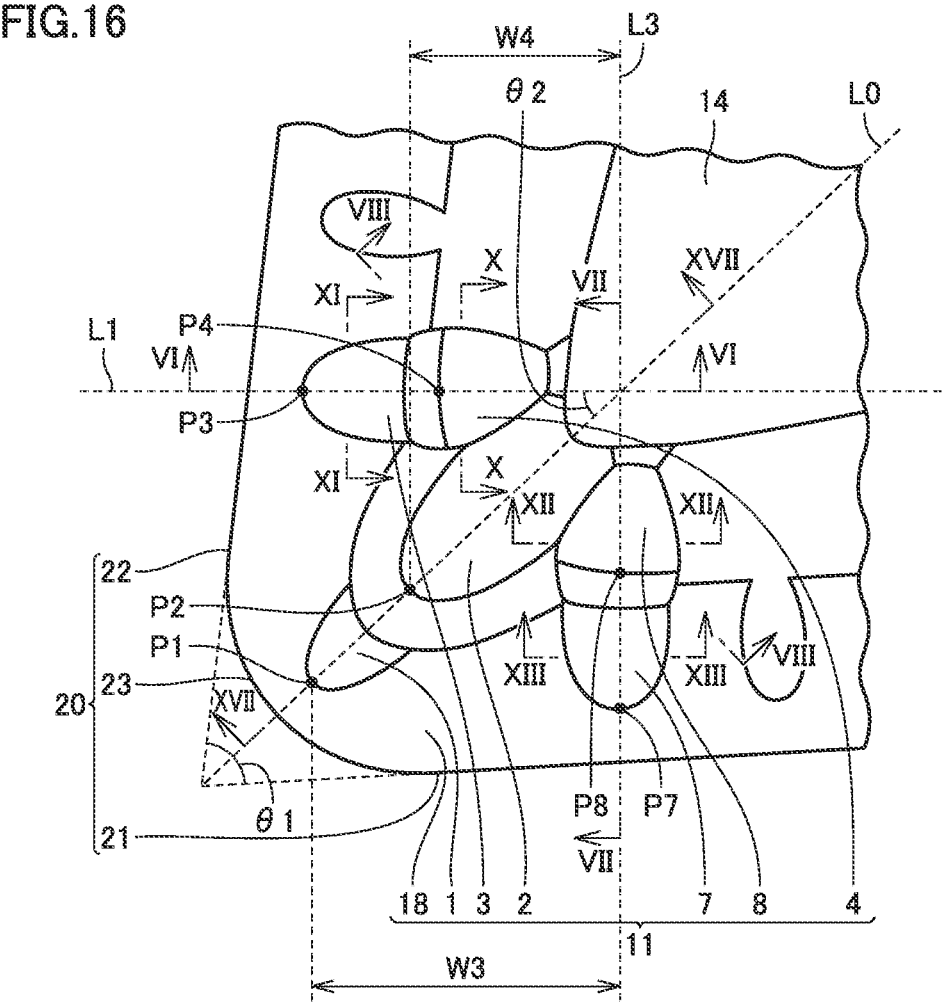
FIG. 16 is a schematic plan view showing a configuration of a cutting insert according to Embodiment 2.
Figure 17:
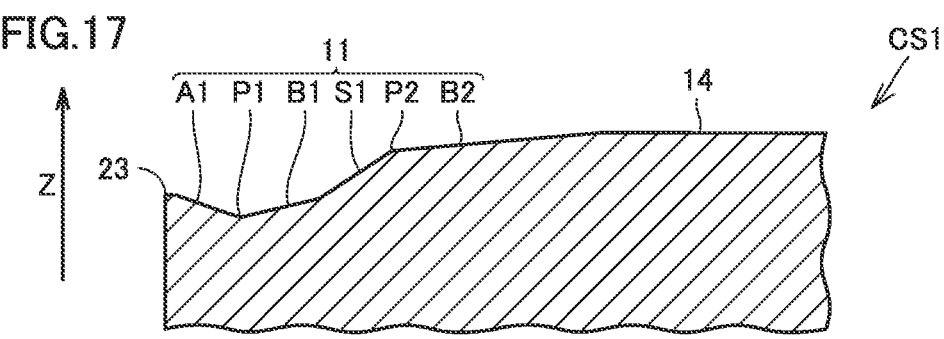
FIG. 17 is a schematic end view taken along line XVII-XVII in FIG. 16.

As shown in FIGS. 16 and 17, first projection 1 of Embodiment 2 may form part of a cylindrical surface, unlike first projection 1 of Embodiment 1. The shapes of second projection 2, third projection 3, and fourth projection 4 of Embodiment 2 are similar to those of Embodiment 1.

As shown in FIG. 17, the height of first inclined portion A1 decreases monotonously from nose portion 23 as apart from nose portion 23 (i.e., from nose portion 23 toward boss surface 14). The height of first breaker portion B1 increases monotonously as apart from nose portion 23. The height of first step surface S1 increases monotonously as apart from nose portion 23. The height of second breaker portion B2 increases monotonously as apart from nose portion 23. The angle of inclination of first step surface S1 is greater than the angles of inclination of first breaker portion B1 and second breaker portion B2. Second position P2 is a position of a point of inflection at which the angle of inclination changes. First position P1 is a position indicative of the minimum height of rake face 11 in first cross section CS1. Cutting insert 100 according to Embodiment 2 also achieves effects similar to those of cutting insert 100 according to Embodiment 1.

Embodiment 3

A configuration of cutting insert 100 according to Embodiment 3 will now be described. A configuration different from that of the cutting insert according to Embodiment 1 will be mainly described below, and similar description will not be repeated.

Figure 18:
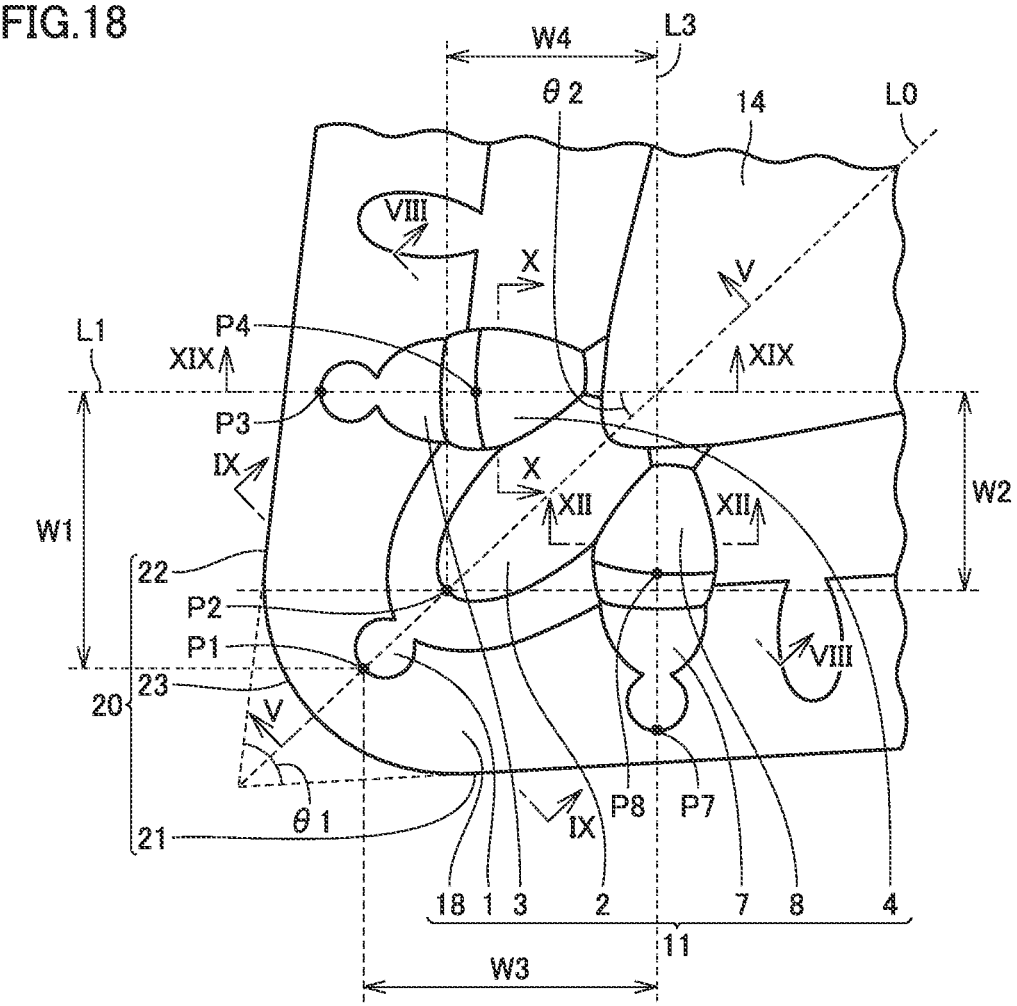
FIG. 18 is a schematic plan view showing a configuration of a cutting insert according to Embodiment 3.
Figure 19:
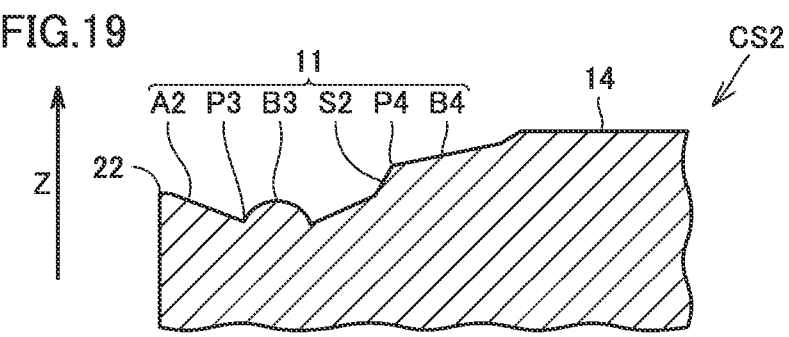
FIG. 19 is a schematic end view taken along line XIX-XIX in FIG. 18.

As shown in FIGS. 18 and 19, third projection 3 of Embodiment 3 may form part of a spherical surface, unlike third projection 3 of Embodiment 1. The shapes of first projection 1, second projection 2, and fourth projection 4 of Embodiment 3 are similar to those of Embodiment 1.

As shown in FIG. 19, the height of second inclined portion A2 decreases monotonously as apart from second cutting edge portion 22 (i.e., from second cutting edge portion 22 toward boss surface 14). As apart from second cutting edge portion 22, the height of third breaker portion B3 increases monotonously, takes the maximum value, and then decreases monotonously. The height of second step surface S2 increases monotonously as apart from second cutting edge portion 22. The height of fourth breaker portion B4 increases monotonously as apart from second cutting edge portion 22. The angle of inclination of second step surface S2 is greater than the angle of inclination of fourth breaker portion B4. Fourth position P4 is a position of a point of inflection at which the angle of inclination changes. Third position P3 is a position indicative of the minimum height of rake face 11 in second cross section CS2. Cutting insert 100 according to Embodiment 3 achieves effects similar to those of cutting insert 100 according to Embodiment 1.

Embodiment 4

A configuration of cutting insert 100 according to Embodiment 4 will now be described. A configuration different from that of the cutting insert according to Embodiment 1 will be mainly described below, and similar description will not be repeated.

Figure 20:
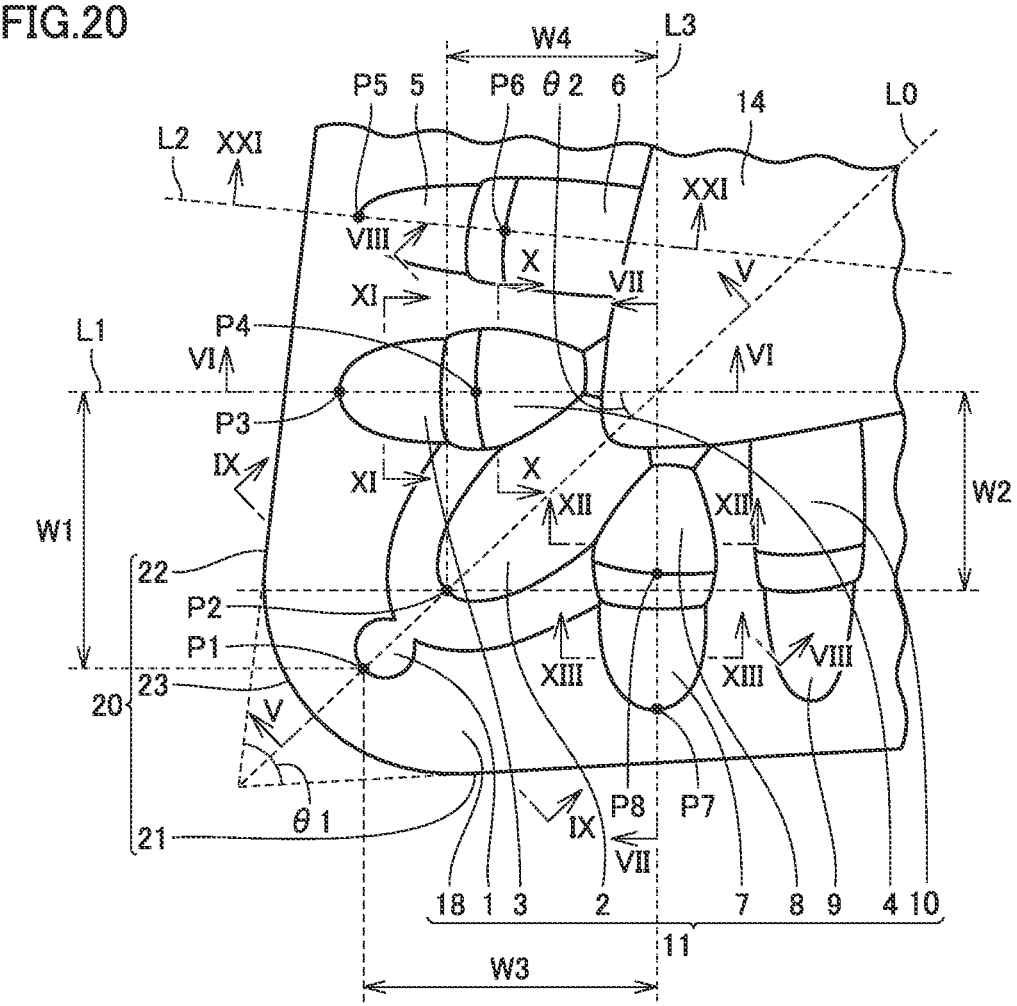
FIG. 20 is a schematic plan view showing a configuration of a cutting insert according to Embodiment 4.
Figure 21:
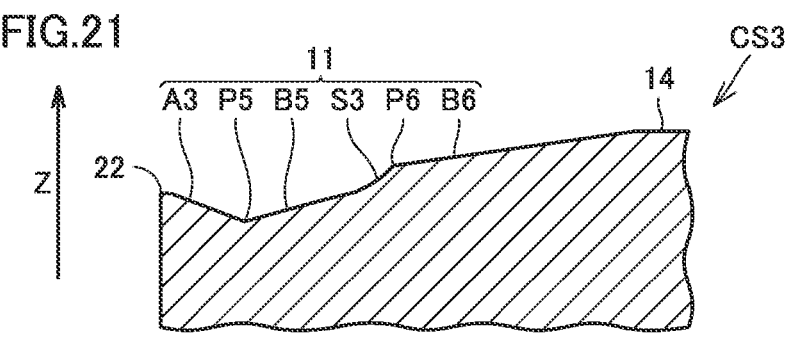
FIG. 21 is a schematic end view taken along line XXI-XXI in FIG. 20.

As shown in FIGS. 20 and 21, rake face 11 may be further provided with a fifth projection 5, a sixth projection 6, a ninth projection 9, and a tenth projection 10. As shown in FIG. 20, fifth projection 5 and sixth projection 6 are located on a second straight line L2 inclined opposite to bisector L0 with respect to first straight line L1, as viewed from the direction perpendicular to seating surface 13. Sixth projection 6 is opposite to second cutting edge portion 22 of cutting edge 20 with respect to fifth projection 5.

As shown in FIG. 21, in third cross section CS3 including second straight line L2 and perpendicular to seating surface 13, rake face 11 has a third inclined portion A3, a fifth breaker portion B5, a third step surface S3, and a sixth breaker portion B6. Third inclined portion A3 is located between fifth projection 5 and second cutting edge portion 22 of cutting edge 20. Fifth breaker portion B5 is continuous with third inclined portion A3 and forms fifth projection 5. Third step surface S3 rises from fifth breaker portion B5. Sixth breaker portion B6 is continuous with third step surface S3 and forms sixth projection 6.

A boundary between third inclined portion A3 and fifth breaker portion B5 and a boundary between third step surface S3 and sixth breaker portion B6 are a fifth position P5 and a sixth position P6, respectively. In this case, sixth position P6 may be higher than fifth position P5 in direction Z perpendicular to seating surface 13. Fifth projection 5 and sixth projection 6 each have a curved portion projecting outwardly. Fifth projection 5 and sixth projection 6 each form, for example, part of a cylindrical surface. The radius of curvature of fifth projection 5 may be smaller than the radius of curvature of sixth projection 6 in the cross section perpendicular to the bisector.

As shown in FIG. 21, the height of third inclined portion A3 decreases monotonously as apart from second cutting edge portion 22 (i.e., from second cutting edge portion 22 toward boss surface 14). The height of fifth breaker portion B5 increases monotonously as apart from second cutting edge portion 22. The height of third step surface S3 increases monotonously as apart from second cutting edge portion 22. The height of sixth breaker portion B6 increases monotonously as apart from second cutting edge portion 22. The angle of inclination of third step surface S3 is greater than the angles of inclination of fifth breaker portion B5 and sixth breaker portion B6. Sixth position P6 is a position of a point of inflection at which the angle of inclination changes. Fifth position P5 is a position indicative of the minimum height of rake face 11 in third cross section CS3.

Preferably, the shapes of sixth projection 6 and tenth projection 10 have line symmetry with bisector L0 as an axis of symmetry. Preferably, the shapes of fifth projection 5 and ninth projection 9 have line symmetry with bisector L0 as an axis of symmetry. Cutting insert 100 according to Embodiment 4 also achieves effects similar to those of cutting insert 100 according to Embodiment 1.

EXAMPLES

[Preparation of Samples]

First, a cutting insert according to an example and a cutting insert according to a comparative example were prepared. The cutting insert according to the example had a two-step main breaker (first projection 1 and second projection 2) and a two-step sub-breaker (third projection 3 and fourth projection 4). Specifically, the cutting insert according to the example was the cutting insert of Embodiment 1 (see FIG. 4). In contrast, the cutting insert according to the comparative example has a two-stage main breaker and no two-step sub-breaker.

[Evaluation Method]

Figure 22:
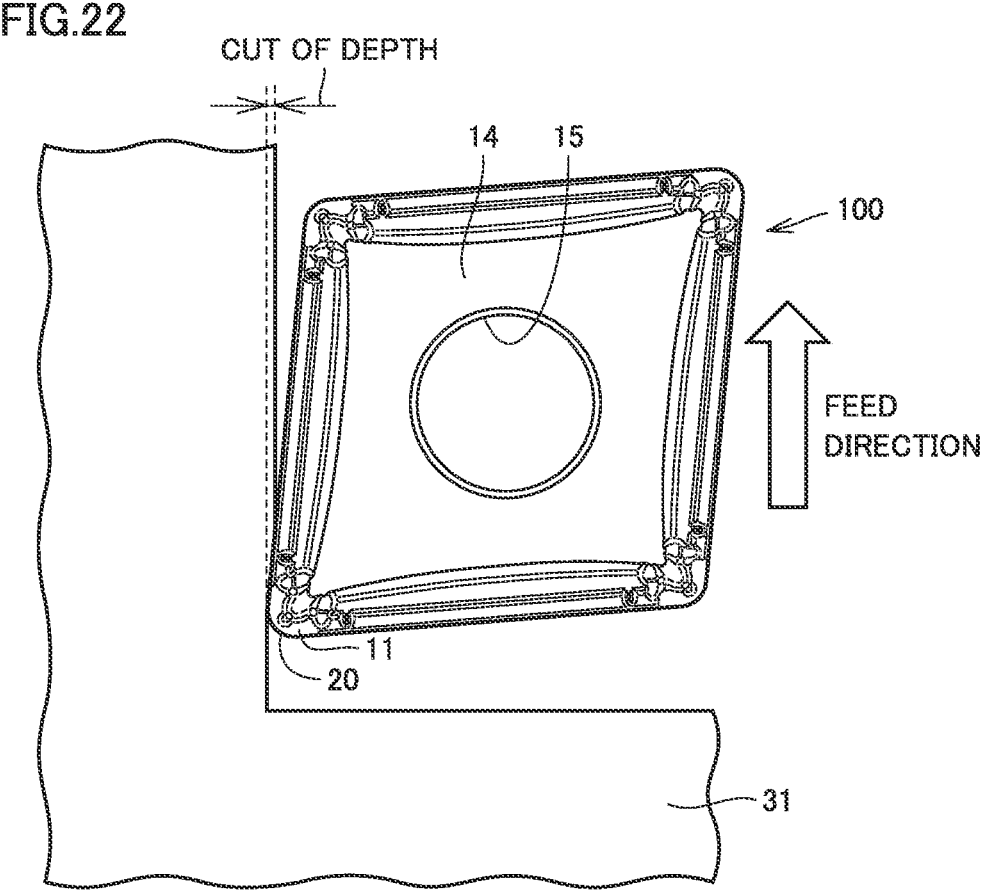
FIG. 22 is a first view showing a pulling method with a cutting insert according to an example and a cutting insert according to a comparative example.
Figure 23:
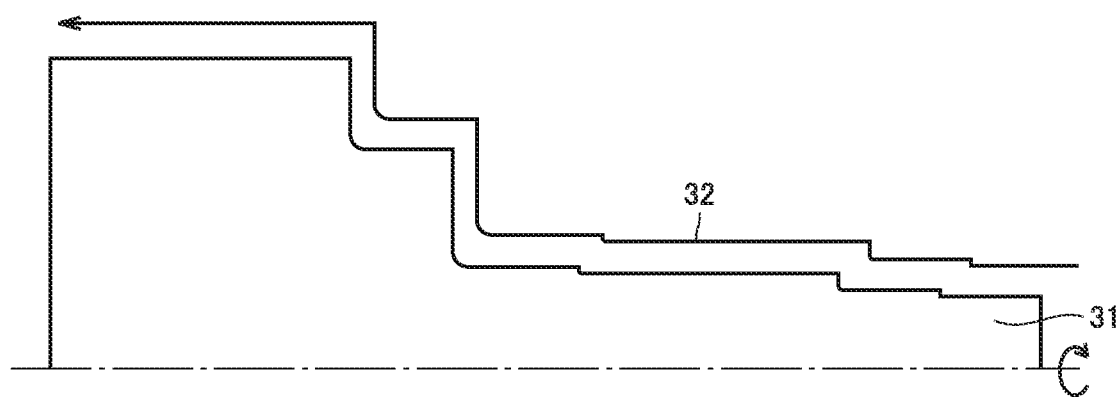
FIG. 23 is a second view showing the pulling method with the cutting insert according to the example and the cutting insert according to the comparative example.

As shown in FIGS. 22 and 23, wet pulling (finishing) was performed with the cutting inserts according to the example and the comparative example. A workpiece 31 was S53C. Workpiece 31 has a shape in which the diameter of the workpiece increases stepwise from one end of the axis of rotation of the workpiece toward the other end. The feed per revolution (f) of the nose portion was 0.25 mm/revolution, and the feed per revolution (f) in the straight portion was 0.45 mm/revolution. The depth of cut (ap) was 0.3 mm. As shown in FIG. 23, cutting edge 20 of cutting insert 100 was brought into contact with workpiece 31 while rotating the workpiece about the axis of rotation, and cutting insert 100 was moved along an arrow 32. Cutting insert 100 alternately and repeatedly moved parallel to the axis of rotation and moved perpendicular to the axis of rotation. After pulling, the chip lengths of the workpieces cut with the cutting inserts according to the example and the comparative example were measured.

[Evaluation Results]

The chip length of the workpiece cut with the cutting insert according to the example was about 150 mm. In contrast, the chip length of the workpiece cut with the cutting insert according to the comparative example was 500 mm or more. These results confirmed that a chip can be divided into short pieces in pulling with the cutting insert of the example which has a two-step main breaker and a two-stage sub-breaker than with the cutting insert of the comparative example which has a two-stage main breaker and no two-stage sub-breaker.

It should be understood that the embodiments and examples disclosed herein have been presented for the purpose of illustration and non-restrictive in every respect. It is intended that the scope of the present invention is not limited to the description above but defined by the scope of the claims and encompasses all modifications equivalent in meaning and scope to the claims.

REFERENCE SIGNS LIST 1 first projection, 2 second projection, 3 third projection, 4 fourth projection, 5 fifth projection, 6 sixth projection, 7 seventh projection, 8 eighth projection, 9 ninth projection, 10 tenth projection, 11 rake face, 12 flank face, 13 seating surface, 14 boss surface, 15 through-hole, 16 upper surface, 18 inclined surface, 20 cutting edge, 21 first cutting edge portion, 22 second cutting edge portion, 23 nose portion, 30 chip, 31 workpiece, 100 cutting insert, A1 first inclined portion, A2 second inclined portion, A3 third inclined portion, A4 fourth inclined portion, B1 first breaker portion, B2 second breaker portion, B3 third breaker portion, B4 fourth breaker portion, B5 fifth breaker portion, B6 sixth breaker portion, B7 seventh breaker portion, B8 eighth breaker portion, CS1 first cross section, CS2 second cross section, CS3 third cross section, CS4 fourth cross section, L0 bisector, L1 first straight line, L2 second straight line, L3 third straight line, P1 first position, P2 second position, P3 third position, P4 fourth position, P5 fifth position, P6 sixth position, P7 seventh position, P8 eighth position, S1 first step surface, S2 second step surface, S3 third step surface, S4 fourth step surface.

The invention claimed is:
1. A cutting insert comprising
a rake face;
a flank face continuous with the rake face; and
a seating surface opposite to the rake face, wherein a ridge line between the rake face and the flank face forms a cutting edge,
the cutting edge includes
a nose portion,
a first cutting edge portion continuous with one end of the nose portion and having a linear shape, and
a second cutting edge portion continuous with another end of the nose portion and having a linear shape,
the rake face is provided with a first projection, a second projection, a third projection, and a fourth projection,
the first projection and the second projection are located on a bisector with an angle formed between the first cutting edge portion and the second cutting edge portion as viewed from a direction perpendicular to the seating surface, and the first projection is located between the nose portion and the second projection,
the third projection and the fourth projection are located on a first straight line inclined with respect to the bisector as viewed from the direction perpendicular to the seating surface, and
the third projection is located between the second cutting edge portion and the fourth projection,
in a first cross section including the bisector and perpendicular to the seating surface, the rake face has
a first inclined portion located between the first projection and the nose portion,
a first breaker portion continuous with the first inclined portion and forming a surface of the first projection,
a first step surface rising from the first breaker portion, and a second breaker portion continuous with the first step surface and forming a surface of the second projection,
in a second cross section including the first straight line and perpendicular to the seating surface, the rake face has
a second inclined portion located between the third projection and the second cutting edge portion,
a third breaker portion continuous with the second inclined portion and forming a surface of the third projection,
a second step surface rising from the third breaker portion, and
a fourth breaker portion continuous with the second step surface and forming a surface of the fourth projection, and
when a boundary between the first inclined portion and the first breaker portion, a boundary between the first step surface and the second breaker portion, a boundary between the second inclined portion and the third breaker portion, and a boundary between the second step surface and the fourth breaker portion are a first position, a second position, a third position, and a fourth position, respectively,
in the direction perpendicular to the seating surface, the second position is higher than the first position, and the fourth position is higher than the third position, and
in a direction parallel to the seating surface and perpendicular to the first straight line, a distance between the first position and the third position is greater than a distance between the second position and the fourth position.

2. The cutting insert according to claim 1, wherein the first projection forms part of a spherical surface, and the second projection forms part of a cylindrical surface.

3. The cutting insert according to claim 2, wherein in a cross section perpendicular to the bisector, a radius of curvature of the first projection is smaller than a radius of curvature of the second projection.

4. The cutting insert according to claim 1, wherein the third projection and the fourth projection form part of a cylindrical surface.

5. The cutting insert according to claim 4, wherein in a cross section perpendicular to the first straight line, a radius of curvature of the third projection is smaller than a radius of curvature of the fourth projection.

6. The cutting insert according to claim 1, wherein in the first cross section, a position of the nose portion is higher than the first position and is lower than the second position in the direction perpendicular to the seating surface.

7. The cutting insert according to claim 1, wherein in the second cross section, a position of the second cutting edge portion is higher than the third position and is lower than the fourth position in the direction perpendicular to the seating surface.

8. The cutting insert according to claim 1, wherein
the rake face is further provided with a fifth projection and a sixth projection,
as viewed from the direction perpendicular to the seating surface, the fifth projection and the sixth projection are located on a second straight line inclined with respect to the first straight line and inclined with respect to the bisector, and the fifth projection is located between the second cutting edge portion and the sixth projection,
in a third cross section including the second straight line and perpendicular to the seating surface, the rake face has
a third inclined portion located between the fifth projection and the second cutting edge portion,
a fifth breaker portion continuous with the third inclined portion and forming a surface of the fifth projection,
a third step surface rising from the fifth breaker portion, and
a sixth breaker portion continuous with the third step surface and forming a surface of the sixth projection, and
when a boundary between the third inclined portion and the fifth breaker portion and a boundary between the third step surface and the sixth breaker portion are a fifth position and a sixth position, respectively, the sixth position is higher than the fifth position in the direction perpendicular to the seating surface.

9. The cutting insert according to claim 1, wherein
the rake face is further provided with a seventh projection and an eighth projection,
as viewed from the direction perpendicular to the seating surface, the seventh projection and the eighth projection are located on a third straight line inclined with respect to the bisector, the bisector is located between the first straight line and the second straight line, and the seventh projection is located between the first cutting edge portion and the eighth projection,
in a fourth cross section including the third straight line and perpendicular to the seating surface, the rake face has
a fourth inclined portion located between the seventh projection and the first cutting edge portion,
a seventh breaker portion continuous with the fourth inclined portion and forming a surface of the seventh projection, a fourth step surface rising from the seventh breaker portion, and an eighth breaker portion continuous with the fourth step surface and forming a surface of the eighth projection, and when a boundary between the fourth inclined portion and the seventh breaker portion and a boundary between the fourth step surface and the eighth breaker portion are a seventh position and an eighth position, respectively, the eighth position is higher than the seventh position in the direction perpendicular to the seating surface, and a distance between the first position and the seventh position is greater than a distance between the second position and the eighth position in a direction parallel to the seating surface and perpendicular to the third straight line.

10. The cutting insert according to claim 1, wherein as viewed from the direction perpendicular to the seating surface, an angle of inclination of the first straight line with respect to the bisector is 20° or more and 90° or less.

11. The cutting insert according to claim 1, wherein a distance between the second position and the fourth position is 0.5 mm or more and 3.0 mm or less in the direction parallel to the seating surface and perpendicular to the first straight line.

* * * * *

UNITED STATES PATENT AND TRADEMARK OFFICE
CERTIFICATE OF CORRECTION

PATENT NO. : 11,185,930 B2
APPLICATION NO. : 16/318021
DATED : November 30, 2021
INVENTOR(S) : Yosuke Shimamoto et al.

It is certified that error appears in the above-identified patent and that said Letters Patent is hereby corrected as shown below:

In the Claims

In Claim 1, please amend as follows:
1. A cutting insert comprising
    a rake face;
    a flank face continuous with the rake face; and
    a seating surface opposite to the rake face, wherein
    a ridge line between the rake face and the flank face forms a cutting edge,
    the cutting edge includes
        a nose portion,
        a first cutting edge portion continuous with one end of the nose portion and having a linear shape, and
        a second cutting edge portion continuous with another end of the nose portion and having a linear shape,
    the rake face is provided with a first projection, a second projection, a third projection, and a fourth projection,
    the first projection and the second projection are located on a bisector with an angle formed between the first cutting edge portion and the second cutting edge portion as viewed from a direction perpendicular to the seating surface, and the first projection is located between the nose portion and the second projection,
    the third projection and the fourth projection are located on a first straight line inclined with respect to the bisector as viewed from the direction perpendicular to the seating surface, and the third projection is located between the second cutting edge portion and the fourth projection,
    in a first cross section including the bisector and perpendicular to the seating surface, the rake face has
        a first inclined portion located between the first projection and the nose portion,
        a first breaker portion continuous with the first inclined portion and forming a surface of the first projection,
        a first step surface rising from the first breaker portion, and
        a second breaker portion continuous with the first step surface and forming a surface Signed and Sealed this
Seventeenth Day of May, 2022

*Katherine Kelly Vidal*

Katherine Kelly Vidal
*Director of the United States Patent and Trademark Office* of the second projection, in a second cross section including the first straight line and perpendicular to the seating surface, the rake face has a second inclined portion located between the third projection and the second cutting edge portion, a third breaker portion continuous with the second inclined portion and forming a surface of the third projection, a second step surface rising from the third breaker portion, and a fourth breaker portion continuous with the second step surface and forming a surface of the fourth projection, and when a boundary between the first inclined portion and the first breaker portion, a boundary between the first step surface and the second breaker portion, a boundary between the second inclined portion and the third breaker portion, and a boundary between the second step surface and the fourth breaker portion are a first position, a second position, a third position, and a fourth position, respectively, in the direction perpendicular to the seating surface, the second position is higher than the first position, and the fourth position is higher than the third position, and in a direction parallel to the seating surface and perpendicular to the first straight line, a distance between the first position and the third position is greater than a distance between the second position and the fourth position.